US005395052A

United States Patent [19]

Schneider et al.

[11] Patent Number: 5,395,052

[45] Date of Patent: Mar. 7, 1995

[54] HIGH-PRESSURE CLEANING DEVICE WITH PUMP HOUSING/SPRAY GUN CONNECTION

[75] Inventors: Josef Schneider; Robert Nathan; Wolfgang Nieuwkamp, all of Backnang, Germany

[73] Assignee: Alfred Karcher GmbH & Co., Winnenden, Germany

[21] Appl. No.: 211,309

[22] PCT Filed: Sep. 30, 1992

[86] PCT No.: PCT/EP92/02261

§ 371 Date: Mar. 29, 1994

§ 102(e) Date: Mar. 29, 1994

[87] PCT Pub. No.: WO93/06938

PCT Pub. Date: Apr. 15, 1993

[30] Foreign Application Priority Data

Oct. 1, 1991 [DE] Germany ........................ 41 32 670.9

[51] Int. Cl.[6] ........................... B05B 9/04; F16B 3/00

[52] U.S. Cl. .................................... 239/154; 239/152; 239/526; 417/234

[58] Field of Search ............... 239/152, 153, 154, 525, 239/526; 417/234

[56] References Cited

U.S. PATENT DOCUMENTS

| | | | |
|---|---|---|---|
| 2,752,200 | 6/1956 | Santarelli | 239/154 X |
| 3,904,116 | 9/1975 | Jones et al. . | |
| 4,810,169 | 3/1989 | Kränzle | 239/152 X |
| 4,972,994 | 11/1990 | Woodhall et al. . | |

FOREIGN PATENT DOCUMENTS

| | | | |
|---|---|---|---|
| 1169827 | 6/1984 | Canada | 239/154 |
| 88 15 807.1 | 12/1989 | Germany . | |
| 90 13 677.2 | 1/1991 | Germany . | |
| 2163632 | 3/1986 | United Kingdom . | |

*Primary Examiner*—William Grant
*Attorney, Agent, or Firm*—Barry R. Lipsitz

[57] ABSTRACT

A high-pressure cleaning device is provided. The device includes a housing enclosing a liquid pump and motor for driving the pump. A spray gun consisting of a jet pipe and an actuating handle is connected to the liquid pump via a hose. The spray gun is releasably attached to the housing such that the cleaning device can be operated by manually gripping the actuating handle of the gun regardless of whether the gun is attached to the housing or not.

7 Claims, 2 Drawing Sheets

HIGH-PRESSURE CLEANING DEVICE WITH PUMP HOUSING/SPRAY GUN CONNECTION

The invention relates to a high-pressure cleaning device having a housing, a liquid pump arranged in the housing, a motor for driving the liquid pump likewise enclosed by the housing, a spray gun comprising a jet pipe and an actuating handle and a hose connecting the liquid pump with the gun.

A device of this type is known from U.S. Pat. No. 4,972,994. It can be operated in two different ways, namely firstly as a stationary device, whereby the housing with the device parts enclosed thereby is stationarily arranged, for example, on the ground and the spray gun connected to the liquid pump via a hose is gripped at its actuating handle by hand and directed onto the areas to be cleaned. On the other hand, when the hose is omitted, the jet pipe can also be directly connected with the housing and the liquid pump, whereby the housing is then gripped at a special handle provided therefor and the unit consisting of the jet pipe and housing is directed onto the areas to be cleaned. With this, it is disadvantageous that in a transition from the one to the other type of operation, the gun together with its hose must be detached from the housing and a separate jet pipe has to be attached to the latter. In addition, the special handle provided at the top side of the housing often does not make an aimed alignment of the liquid spray jet exiting the jet pipe possible onto the area to be cleaned.

The object of the invention is to remedy the described shortcomings and to design a generic high-pressure cleaning device such that, on the one hand, it can be operated with a spray gun connected to a hose and, on the other hand, with a jet pipe rigidly arranged on the housing and in the transition from the one to the other type of operation, no essential equipment changeover operations are required.

The object is accomplished in accordance with the invention by connecting means for releasably attaching the spray gun to the housing such that the unit consisting of gun and housing can be operated by manually gripping the actuating or control handle of the gun.

With that, the spray gun, thus, remains constantly connected to the housing with its hose, however, the unit consisting of the housing and the gun can be gripped at the actuating handle of the gun and in the same manner as the gun on its own, can be precisely directed onto the areas to be cleaned.

The following description of preferred embodiments of the invention serve to explain the invention in further detail in conjunction with the drawings: In the drawings:

FIG. 3 shows a high-pressure cleaning device with an internal combustion engine for driving a high-pressure pump FIG. 4 shows a front view of the device from FIG. 3 and FIG. 5 shows an alternate mounting of the spray gun on the housing.

Figure 1:
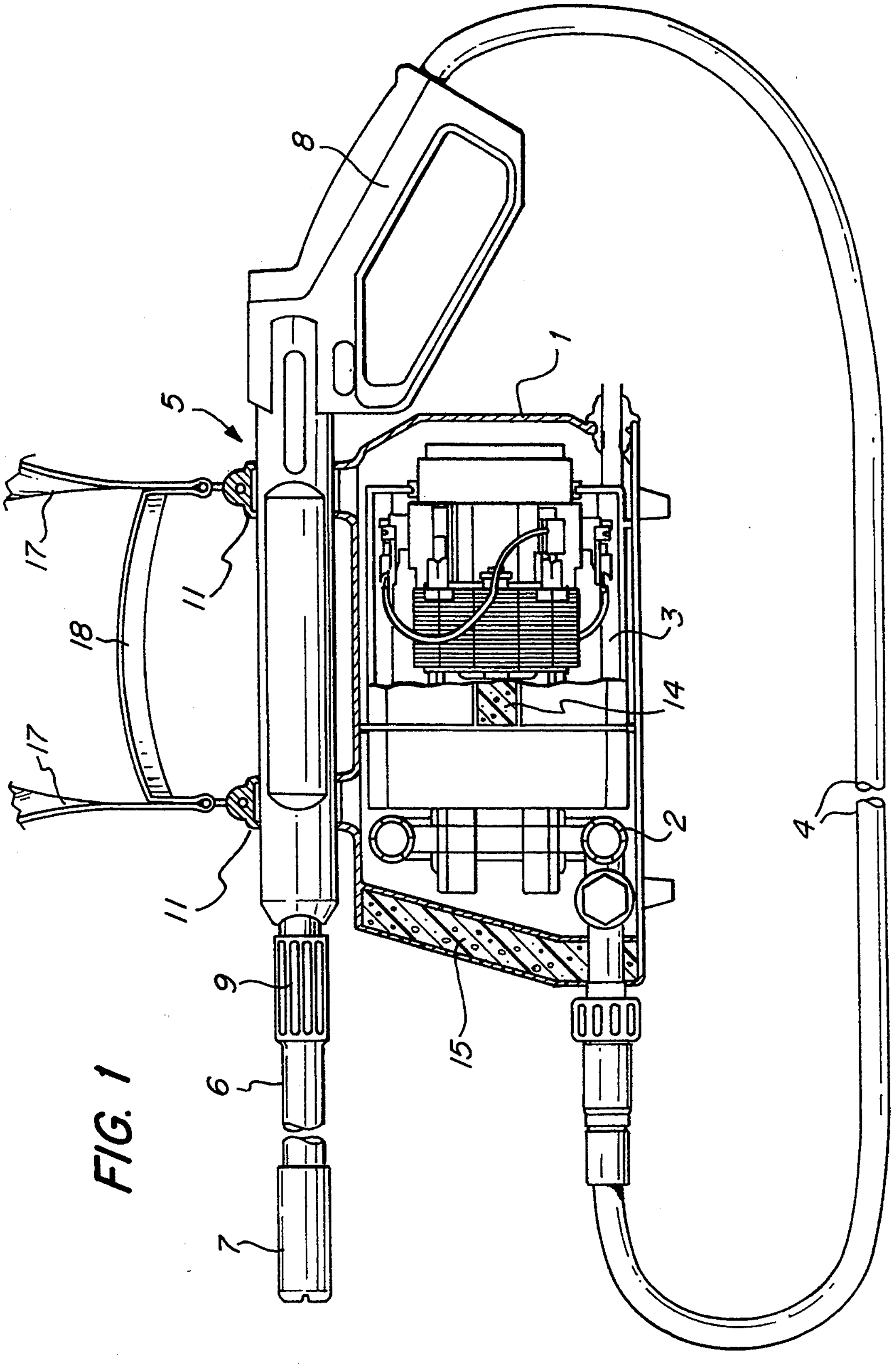
FIG. 1 shows a high-pressure cleaning device in side view, with an electric motor for driving a high-pressure pump.
Figure 2:
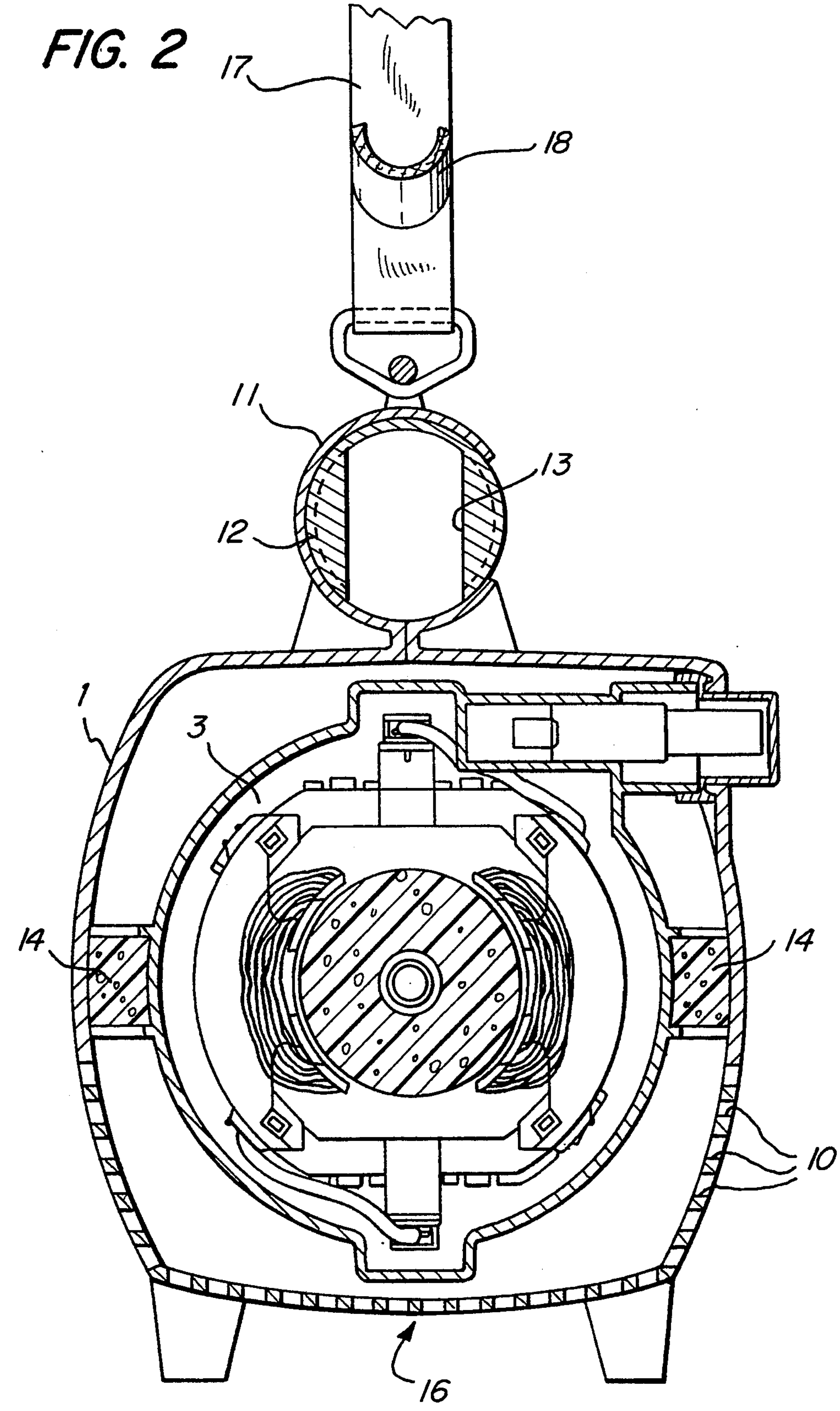
FIG. 2 shows the device from FIG. 1 in cross-sectional view.

The high-pressure cleaning device represented in FIGS. 1 and 2 comprises a housing 1 which encloses a customary liquid high-pressure pump 2. The pump 2 is driven by an electric motor 3. A flexible hose 4 leaves the pump 2 and is connected with a spray gun 5. The spray gun 5 comprises, for its part in the conventional manner, a jet pipe 6 with spray nozzle 7 and an actuating handle 8 into which the hose 4 opens. The actuating or control handle 8 comprises, in a manner known per se, a hand-operated switch (not illustrated) for switching a high-pressure spray jet exiting the nozzle 7 on and off. The gun 5 is manually gripped at the actuating handle 8 and is aligned with its nozzle onto the area to be cleaned. Normally, the housing 1 with its components enclosed therein is stationarily placed on the ground, while the spray gun 5, which is merely connected with the housing via the flexible hose 4, is freely and movably aimed at the area to be cleaned. With this, the action radius is naturally limited by the length of the hose 4.

As is apparent from FIGS. 1 and 2, the spray gun 5 can be rigidly attached in a releasable manner to the housing 1 by utilizing connecting means according to the invention (still to be described). In this manner, the spray gun 5 and the housing 1 form a fixed unit which can be manually gripped at the actuating handle 8 and be directed onto the areas to be cleaned. Thus in this case, the operator carries along the entire unit and is no longer limited in his/her action radius by the length of the hose 4. The operation preferably takes place in the manner such that the unit is gripped at the actuating handle 8 with the one hand, for example the right hand, while the other hand grasps a handle 9 provided for this at the jet pipe 6. Instead of the handle 9 at the jet pipe 6, a handle, for example, protruding downwards or to the side (not illustrated) could also be rigidly provided at the housing 1.

The connecting means for releasably attaching the spray gun 5 to the housing 1 comprise, in the illustrated embodiment, two ring-shaped sleeves 11 fixedly connected with the housing 1, which are open to one side. A rotating or rotary member 12, which has a radially extending, relatively broad slot 13, is rotatably arranged in the sleeves 11. This slot 13 is aligned in FIG. 2 by correspondingly turning the rotating member such that it is closed at its opening by the sleeve 11. This is the normal operating position of the rotating member 12. When the rotating member (in FIG. 2) is turned anticlockwise through 90°, the slot 13 opens to the right, so that a complementarily designed section of the spray gun 5 can be inserted into the slot 13, after which the spray gun 5 is turned back together with the rotating member 12 into the position represented in FIG. 2. In this manner, the spray gun 5 can be fixedly yet releasably connected with the housing 1. For detachment, the spray gun 5 and the rotary members 12 of the two sleeves 11 are turned in opposite direction so that the spray gun can be taken out of the slot 13 and the sleeve 11.

When the spray gun 5 and the housing 1 are connected in the described manner to form the unit represented in FIG. 1, this unit can essentially be handled as with the spray gun on its own, since the unit, as with the spray gun 5 on its own, is gripped at the actuating handle 8 and, if necessary, at the handle 9. The relatively heavy housing 1 with the components enclosed thereby, oscillates freely about the axis of the spray gun 5 due to the described rotatable connection. Due to the oscillating attachment of the housing 1 to the spray gun 5, it is ensured that the housing 1 always hangs downwards so that the cooling-air suction slots 10 provided at the housing 1 are always located under the spray gun 5.

The mentioned sections of the spray gun 5 complementary to the soffits of the slots 13 are designed such that they simultaneously avoid an axial displacement of the spray gun 5 in the sleeves 11.

In another embodiment of the invention, instead of the sleeves 11 fixedly arranged on the housing 1, two corresponding ring members 20 could also be rotatably arranged directly on the spray gun 5 as illustrated in FIG. 5. These rotatable ring members are locked directly with the housing in a manner known per se, so that again a rotatable connection between spray gun 5 and housing 1 is likewise obtained.

In the represented embodiment, the connecting means comprise two respective sleeves or ring members between spray gun 5 and housing 1. Fundamentally, it is sufficient to provide just a single sleeve or a single ring member, which can then, in this case, be designed to be correspondingly longer axially, for example in the form of a bushing.

In order to protect the electric motor 3 from the penetration of liquid, in particular, spray water, spray protection elements in the form of foamed plastic mats, which are designated with the reference numerals 14 or 15 in FIGS. 1 and 2, are provided between this electric motor and the housing 1. These spray protection mats allow the entry and exit of cooling air for the electric motor 3, however, prevent the penetration of moisture. Instead of the mentioned foamed plastic mats 14, 15 or in addition to these mats, a labyrinth-like air passage can also be provided in the housing 1 as spray protector, so as to prevent the penetration of water drops onto the voltage-carrying parts of the electric motor 3.

The housing 1 of the high-pressure cleaning device 1 is advantageously designed as an injection molded plastics part, whereby a film hinge is preferably formed at the point indicated with the arrow 16 in FIG. 2 and thus the housing 1 can be manufactured in one piece from two half shells.

Furthermore, as is shown in the drawing, the unit consisting of the housing 1 and the spray gun 5 can be connected further with a carrying strap 17, which allows an operator to carry the unit hanging over the shoulder. In this case, the weight of the unit is taken up by the shoulder and the operator, for example, merely needs to grasp the actuating handle 8 with one hand in order to directly aim the spray jet onto the area to be cleaned. The carrying strap 17 which, for example, can be attached to the sleeves 11 via hooks, further has a carrying handle 18 connecting both parts of the carrying strap 17, which can be made of the same flexible material as the carrying strap 17 and at which the mentioned unit can be gripped and carried.

The embodiment of a high-pressure cleaning device represented in FIGS. 3 and 4 differs from the one according to FIGS. 1 and 2 merely in that an ordinary (not visible) internal combustion engine is arranged in the housing 1 instead of the electric motor 3. Moreover, the device according to FIGS. 3 and 4 corresponds in its construction and function with the embodiment according to FIGS. 1 and 2.

Since an internal combustion engine is less moisture sensitive than an electric motor, the spray protection elements 14 and 15 described in connection with FIGS. 1 and 2 can be omitted in the embodiment according to FIGS. 3 and 4.

On the other hand, when utilizing an internal combustion engine for driving the liquid pump, it is favorable to provide vibration-damping means between the housing 1 and the spray gun 5 attached thereto via the connecting means, for example, the sleeves 11, these damping means preventing the oscillations unavoidably eminating from the combustion engine from being transferred to the spray gun and thus to the hand of an operator holding this spray gun. Such vibration-damping elements are known per se and, therefore, do not need to be described here in detail. It would, for example, be sufficient to provide elastic members, for example a rubber buffer 22 or the like, between the sleeves 11 and the housing 1.

We claim:

1. A high pressure cleaning device comprising:
- a liquid pump;
- a motor for driving said liquid pump;
- a housing for enclosing said liquid pump and said motor;
- a spray gun comprising:
  - a jet pipe with a spray nozzle;
  - an actuating handle for manipulating said spray gun and, in use, controlling the flow of a high-pressure spray jet exiting said spray nozzle;
- a hose connecting said liquid pump with said spray gun; and,
- connecting means for releasably attaching said spray gun to said housing, said connecting means being characterized in that it permits said housing to rotate and freely oscillate about the longitudinal axis of the jet pipe of said spray gun when said spray gun is attached to said housing, such that when operating the cleaning device by manually gripping said spray gun with said housing hanging downwardly therefrom, the housing will continue to hang downwardly therefrom during rotation of the spray gun about the longitudinal axis of the jet pipe.

2. A device according to claim 1, wherein the connecting means comprise at least one sleeve arranged on said housing for receiving and allowing said spray gun to rotate therewithin.

3. A device according to claim 2, wherein said spray gun is rotatably mounted in said sleeve via a rotating member having a radially extending slot adapted to receive a complementary section of said spray gun.

4. A device according to claim 1, wherein said connecting means comprise at least one ring member rotatably arranged on said spray gun, said ring member being lockable on said housing.

5. A device according to claim 1, further comprising vibration-damping elements arranged between said housing and said spray gun.

6. A device according to claim 1, further comprising a carrying strap mounted to said connecting means.

7. A device according to claim 6, further comprising a carrying handle provided on said carrying strap.

* * * * *